Jan. 25, 1927.
J. T. CANTRELL
1,615,300
TAIL BOARD FASTENER
Filed Nov. 3, 1922
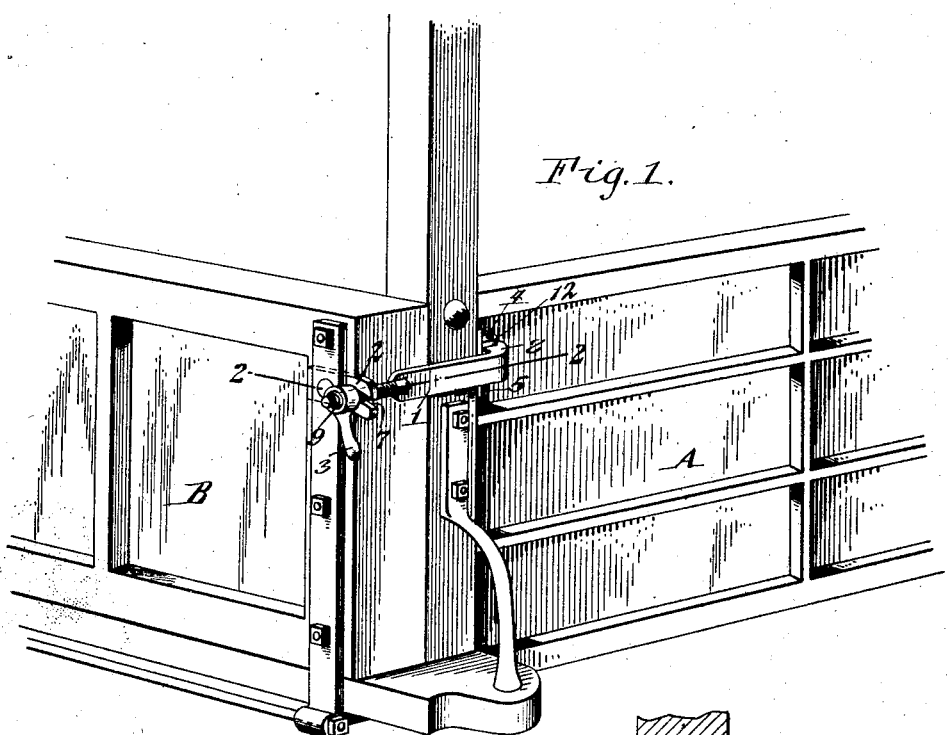
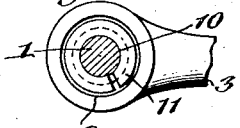
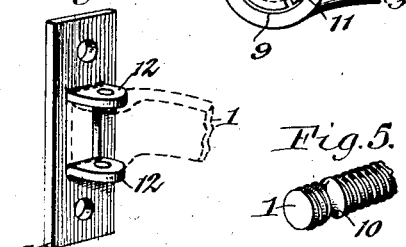
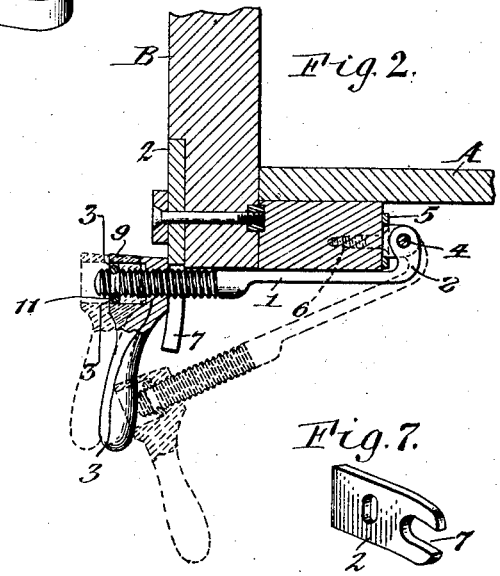
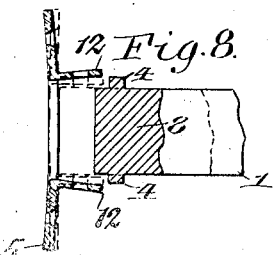
Inventor
Joseph T. Cantrell
by Geyer & Popp
Attorneys Patented Jan. 25, 1927.

1,615,300

UNITED STATES PATENT OFFICE.

JOSEPH T. CANTRELL, OF HUNTINGTON, NEW YORK, ASSIGNOR TO J. T. CANTRELL & COMPANY, OF HUNTINGTON, NEW YORK, A FIRM.

TAILBOARD FASTENER.

Application filed November 3, 1922. Serial No. 598,928.

This invention relates to improvements in fasteners for the tail boards of wagons or trucks.

The principal object is to provide a simply constructed fastener which will secure the end gate with certainty under all conditions.

A further object is to provide a fastener which may be quickly and securely fitted to the wagon.

With the above objects in view the invention consists of certain features of structure and combination which involve a shank of novel form and arrangement, novel means for securing the fastening nut and a novel form of parts for fitting the fastener to the wagon, all as will be set out in detail in the course of the following description.

In the accompanying drawing:

Figure 1 is a perspective view of a fastener in which the features of the invention are incorporated and in operative position with respect to the tail board.

Figure 2 is a horizontal sectional view on the line 2—2 of Figure 1.

Figure 3 is a detail sectional view on the line 3—3 of Figure 2.

Figure 4 is a perspective view of the securing bracket.

Figure 5 is a perspective view of the free end of the shank.

Figure 6 is a perspective view of the securing ring for the fastening nut.

Figure 7 is a perspective view of the guard with which the fastening nut cooperates.

Figure 8 is a detail sectional view showing the manner in which the shank is fitted to the securing bracket.

The principal parts of the fastener are, a shank 1 which is pivoted on the wagon body A, a guard 2 which is secured to and projects laterally from the tail board B, and a securing nut 3 which is fitted on the threaded end of the shank 1 and bears against the guard 2. The shank 1 is pivoted, as at 4, to a bracket 5 which is secured by screws 6 to a suitable part of the wagon body. The guard 2 has an end recess 7 into which the shank is movable and through which the shank projects when in normal position to effect the fastening of the tail board.

According to the invention the pivot 4 is offset, as by means of an angular integral extension 8, from the body of the shank whereby in the direction in which the shank is movable to disengage the guard 2 a pronounced angle is developed behind the guard by the chord having said pivot as a radial center and extended from the normal point of contact between the guard and the nut 3. This angle is greater in degree than the corresponding angle which would be developed were the pivot located in alignment with the body of the shank and the purpose of its provision is to prevent the shank from accidentally disengaging the guard in case the nut 3 were to work loose to a sensible degree. In other words the arrangement of the pivot 4 is such that the nut 3 up to a limit not ordinarily encountered can work loose relatively to the guard without permitting the shank to swing outward from the guard. The angle described, and the effect thereof for the purpose in view, can, as an added measure of safety, be heightened by forming the end of the guard with a slight outward curvature as shown in Figure 2.

Provision is made for preventing the nut 3 from becoming disengaged from the shank when the latter is in position to secure the tail board. According to the invention the nut 3 has a co-axial recess 9 in its outer face and the threaded portion of the shank is formed with an annular groove 10 as a seat for an annular key 11 which is normally disposed in the recess 9. When the shank is in position to secure the tail board the recess 9, whatever the position of the nut 3, will enclose and hence prevent displacement of the key 11 from any cause while the latter will prevent the nut 3 from becoming disengaged from the shank. When the shank 1 is swung clear of the guard 2 in order to release the tail board, as shown by broken lines in Figure 2, the nut 3 may be moved along the shank toward the pivotal end thereof for a sufficient distance to permit access to the key 11 for any purpose desired.

The invention also provides in a novel manner for the quick and secure application of the shank to the wagon. For this purpose the bracket 5 is in the form of a plate of resilient or bendable metal and the ears 12 in which the pivot 4 engages are struck from said bracket, while the pivot is preferably formed with, or fixedly secured to, the shank; as shown the pivot is formed integrally on the extension 8 as end trunnions. In fitting the shank 11 to the bracket 5 the metallic plate which forms the body of said bracket is flexed from its normal plane, as shown in Figure 8, so as to cause the ears 12 to diverge; and when the ears 12 are so spread the offset 8 is introduced between them so as to aline the trunnions 4 with the openings in said ears. The bracket is then relaxed whereby the plate thereof returns into its normal plane and the ears 12 assume their normal parallel relation with their openings surrounding the trunnions 4, thereby to effect the secure pivotal connection of the shank to the bracket. The shank is then ready for attachment by means of the bracket 5 and the securing screws 6 to the supporting part of the wagon body.

Having fully described my invention, I claim:

1. In a fastener for wagon tail boards, the combination with a pivoted shank having a threaded free end portion, and a guard having an end recess for said shank, of a nut mounted on the threaded portion of said shank and having an axial recess in its outer face, and a key removably fitted on said threaded portion to prevent the displacement of the nut from said shank, said key lying within the recess of said nut and being confined by the wall of said recess in any position of said nut in advance of the guard when the shank is in its operative position.

2. In a fastener for wagon tail boards, the combination with a pivoted shank having a threaded free end portion, and a guard having an end recess for said shank, of a nut mounted on the threaded portion of said shank and having an axial recess in its outer face, the shank having an annular groove in its threaded portion, and an annular key removably fitted in said groove to prevent the displacement of the nut from said shank, said key lying within the recess of said nut and being confined by the wall of said recess in any position of said nut in advance of the guard when the shank is in its operative position.

JOSEPH T. CANTRELL.